United States Patent
Tsai et al.

(10) Patent No.: US 10,094,689 B2
(45) Date of Patent: Oct. 9, 2018

(54) FLUID FLOW METERING DEVICE AND METHOD THEREOF

(71) Applicant: Nuvoton Technology Corporation, Hsinchu (TW)

(72) Inventors: Hsi-Jung Tsai, Hsinchu (TW); Jing-Shiang Tseng, Hsinchu (TW); Cheng-Chih Wang, Hsinchu (TW); Chia-Ching Lu, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 598 days.

(21) Appl. No.: 14/481,927

(22) Filed: Sep. 10, 2014

(65) Prior Publication Data

US 2015/0241259 A1    Aug. 27, 2015

(30) Foreign Application Priority Data

Feb. 21, 2014   (TW) ............... 103105912 A

(51) Int. Cl.
*G01F 1/00*   (2006.01)
*G01F 3/00*   (2006.01)
*G01F 3/30*   (2006.01)

(52) U.S. Cl.
CPC ............... *G01F 1/00* (2013.01); *G01F 3/00* (2013.01); *G01F 3/30* (2013.01)

(58) Field of Classification Search
CPC ............... G01F 1/00; G01F 3/00; G01F 3/30
(Continued)

(56) References Cited

U.S. PATENT DOCUMENTS 6,647,717 B2 * 11/2003 Zaslavsky ............... F03D 1/00
                                                                        60/398
8,081,504 B2    12/2011 Chen et al.
(Continued)

FOREIGN PATENT DOCUMENTS

CN    101478031    7/2009
CN    102169719    8/2011
(Continued)

OTHER PUBLICATIONS

Lachapelle et al, Comparing energy density of some capacitors, ultracapacitors and batteries, 2008.*
(Continued)

*Primary Examiner* — Sujoy Kundu
*Assistant Examiner* — Lynda Dinh
(74) *Attorney, Agent, or Firm* — JCIPRNET

(57) ABSTRACT

A fluid flow metering device and a method thereof are provided. The fluid flow metering device includes a fluid flow detector, a memory, a micro controller and a power generator. The fluid flow detector is disposed in a supply tube of a fluid flow provider. When the fluid flows in the supply tube, the power generator generates a supplying power through flow of the fluid, and provides the supplying power to the fluid flow detector, the memory and the micro controller. When the fluid flow detector detects the flow of the fluid, the fluid flow detector detects the flow of the fluid outputted from the supply tube to derive a detecting value. The micro controller receives the detecting value and writes the detecting value into the memory, or the micro controller converts the detecting value into a flow value and writes the flow value into the memory.

21 Claims, 2 Drawing Sheets

(58) Field of Classification Search
USPC .......................................................... 702/45
See application file for complete search history.

(56) References Cited

U.S. PATENT DOCUMENTS

| | | | |
|---|---|---|---|
| 8,113,437 B2 | 2/2012 | Kang | |
| 8,115,188 B2 | 2/2012 | Gosain et al. | |
| 8,270,226 B2 | 9/2012 | Choi et al. | |
| 8,445,888 B1* | 5/2013 | Chu | G11C 13/0007 |
| | | | 257/4 |
| 8,477,055 B2 | 7/2013 | Choi et al. | |
| 8,589,764 B2 | 11/2013 | Takeuchi et al. | |
| 8,635,511 B2 | 1/2014 | Takeuchi et al. | |
| 8,884,156 B2* | 11/2014 | Schmaelzle | H01L 31/0524 |
| | | | 136/246 |
| 2010/0085211 A1* | 4/2010 | Wang | G01F 1/10 |
| | | | 340/870.02 |
| 2012/0042200 A1 | 2/2012 | Takeuchi et al. | |
| 2012/0303870 A1 | 11/2012 | Park et al. | |
| 2013/0027079 A1 | 1/2013 | Nazarian et al. | |
| 2013/0027081 A1 | 1/2013 | Nazarian et al. | |
| 2013/0207815 A1* | 8/2013 | Pitchford | G01D 4/004 |
| | | | 340/870.02 |

FOREIGN PATENT DOCUMENTS

| | | |
|---|---|---|
| CN | 102412827 | 4/2012 |
| JP | 2012141268 | 7/2012 |
| KR | 101031420 | 4/2011 |
| KR | 20110057839 | 6/2011 |
| TW | 200413699 | 8/2004 |
| TW | 201109627 | 3/2011 |
| TW | 201110046 | 3/2011 |
| TW | 201334344 | 8/2013 |

OTHER PUBLICATIONS

"Office Action of Taiwan Counterpart Application," dated Feb. 5, 2015, p. 1-p. 7.

* cited by examiner

FLUID FLOW METERING DEVICE AND METHOD THEREOF

CROSS-REFERENCE TO RELATED APPLICATION

This application claims the priority benefit of Taiwan application serial no. 103105912, filed on Feb. 21, 2014. The entirety of the above-mentioned patent application is hereby incorporated by reference herein and made a part of this specification.

BACKGROUND

Technical Field

The embodiments of the invention relates to a fluid flow metering device and a method thereof.

Related Art

From home to various large buildings, fluid flow meters such as water meters or gas meters are widely used in daily life for measuring fluid flow. A smart meter proposed for measuring the fluid flow is gradually popular recently. The smart meter is applied to kilowatt-hour meter in the beginning, and is then developed to measure fluid flow of water and gas, etc. Different from the power measurement, when the smart meter is used for measuring the fluid flow, power consumption issue has to be considered. Moreover, duration of measurement of the water meter or the gas meter is very long, while power supply of a battery therefore is limited. When the power of the battery is exhausted, the smart meter may stop operating and probably cuts off supply of water or gas, which may cause great inconvenience to the user.

SUMMARY

In one of exemplary embodiments of the invention provides a fluid flow metering device including a fluid flow detector, a memory, a micro controller and a power generator. The fluid flow detector is disposed in a supply tube of a fluid flow provider. When a fluid flows in the supply tube, the power generator generates a supplying power through flow of the fluid, and provides the supplying power to the fluid flow detector, the memory and the micro controller. When the fluid flow detector detects the flow of the fluid, the fluid flow detector detects the flow of the fluid outputted from the supply tube to derive a detecting value. The micro controller receives the detecting value and writes the detecting value into the memory, or the micro controller converts the detecting value into a flow value and writes the flow value into the memory.

An embodiment of the invention provides a method for metering fluid flow, which is adapted to a fluid flow metering device disposed in a supply tube supplying a fluid and includes following steps. When the fluid flows, a supplying power generated based on the flow of the fluid is received. When the supplying power is received, the flow of the fluid is detected to obtain flow information. The flow information is stored into a memory of the fluid flow metering device.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
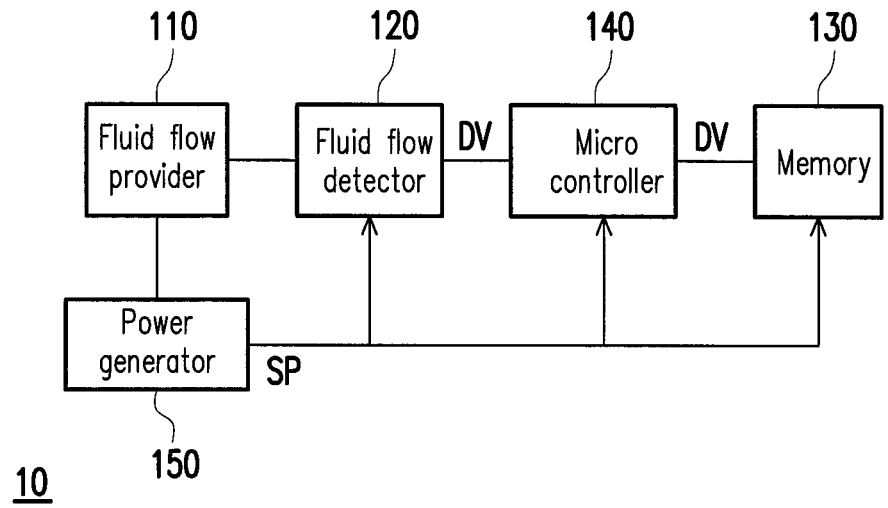
FIG. 1 is a block diagram of a fluid flow metering device according to an embodiment of the invention.

FIG. 1 is a block diagram of a fluid flow metering device according to an embodiment of the invention. Referring to FIG. 1, the fluid flow metering device 10 includes a fluid flow detector 120, a memory 130, a micro controller 140 and a power generator 150. The fluid flow detector 120 is disposed in a supply tube of a fluid flow provider 110, where the fluid flow provider 110 can output a fluid through the supply tube. The micro controller 140 is coupled to the fluid flow detector 120 and the memory 130. The power generator 150 is disposed in the supply tube, and is coupled to the fluid flow detector 120, the memory 130 and the micro controller 140.

When the fluid flows in the supply tube of the fluid flow provider 110, the power generator 150 generates a supplying power SP through the flow of the fluid, and provides the supplying power SP to the fluid flow detector 120, the memory 130 and the micro controller 140. When the fluid flow detector 120 detects the flow of the fluid, the fluid flow detector 120 detects the flow of the fluid outputted from the supply tube to derive flow information such as a detecting value DV. Moreover, the micro controller 140 receives the detecting value DV and writes the detecting value DV to the memory 130, or converts the detecting value DV into a flow value (for example, a flow value FV shown in FIG. 2), and writes the flow value to the memory 130.

The fluid flow detector 120 can be, for example, a fluid flow meter, a pressure meter, a fluid density detection meter (which is, for example, implemented by an ultrasound transmitter and a receiver) or other detectors capable of detecting the flow, flow velocity and/or pressure, which is used for directly or indirectly providing the flow information. For example, a processing unit in the fluid flow detector 120 may obtain the flow information according to the fluid pressure information. The micro controller 140 may be implemented with or by a special purpose logic circuit, or an integrated circuit such as an embedded controller. The memory 130 can be a non-volatile memory. In an embodiment, the non-volatile memory is capable of operating with a low voltage, a low current or a low power consumption. The non-volatile memory can be, for example, a resistive random-access memory (RRAM), a ferroelectric RAM (Fe-RAM), a magneto resistive RAM (MRAM), a phase change RAM (PRAM), or a conductive bridge RAM (CBRAM).

In the embodiment of the invention, the fluid flow metering device 10 can generate the supplying power based on the flow of a fluid (for example, water or gas) flowing out from the supply tube of the fluid flow provider 110, and meters the flow of the fluid and records flow information by using the supplying power. In other words, when the fluid flows in the supply tube of the fluid flow provider 110, the power generator 150 can generate a supplying power SP through the flow of the fluid, and provides the supplying power SP to the fluid flow metering device 10 to, for example, meter and record the flow of the fluid. In this way, when the fluid flow metering device 10 is a fluid flow meter such as a water meter or a gas meter installed in a building or in home, since the flow of the fluid can be continuously metered and recorded by using the supplying power SP provided by the power generator 150, supply of the fluid will not be cut off due to lack of power supply of the fluid flow metering device 10. Moreover, the power generated based on the flow of the fluid is enough to drive the fluid flow detector 120, the memory 130 and the micro controller 140 to normally operate. For example, a fluid displacement tachometer may be used as the fluid flow detector 120, a RRAM is used as the memory 130, and a logic circuit with a low start voltage is used as the micro controller 140, though the invention is not limited thereto.

Figure 2:
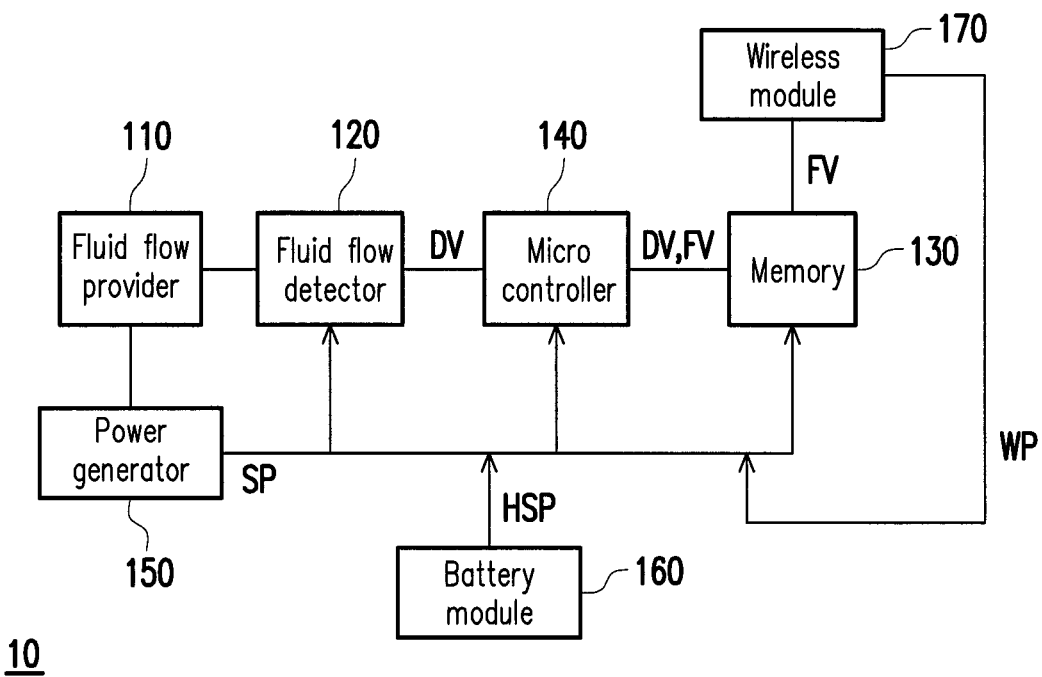
FIG. 2 is a block diagram of a fluid flow metering device according to an embodiment of the invention.

FIG. 2 is a block diagram of a fluid flow metering device according to an embodiment of the invention. Referring to FIG. 2, a coupling relationship of the fluid flow provider 110, the fluid flow detector 120, the memory 130, the micro controller 140 and the power generator 150 is as that described in the embodiment of FIG. 1, which is not repeated again. In the embodiment of FIG. 2, the fluid flow metering device 10 further includes a battery module 160 and a wireless module 170.

In the embodiment, the micro controller 140 may have two working modes, for example, a low power supply mode and a high power supply mode. When the micro controller 140 receives the supplying power SP transmitted by the power generator 150, the micro controller 140 can set the working mode to the low power supply mode. In the low power supply mode, the micro controller 140 can perform simple computations, for example, writing the detecting values DV detected by the fluid flow detector 120 into the memory 130. On the other hand, when the micro controller 140 receives a supplying power HSP transmitted by the battery module 160, the micro controller 140 can set the working mode to the high power supply mode. The detailed description of high power supply mode will be described as below.

In an embodiment, the battery module 160 can be coupled to the fluid flow detector 120, the memory 130 and the micro controller 140. When the electricity or power supplied by the battery module 160 is greater than a predetermined value (for example, a predetermined voltage), the battery module 160 can supply a supplying power HSP to the fluid flow detector 120, the memory 130 and the micro controller 140, where the supplying power HSP is a higher supplying power that is greater than the supplying power SP and a predetermined value. In another embodiment of the invention, when the electricity or power supplied by the battery module 160 is greater than the predetermined value, and a control signal is received, the battery module 160 supplies the supplying power HSP to the fluid flow detector 120, the memory 130 and the micro controller 140. The aforementioned control signal can be, for example, a control signal generated through an operation of the user, a control signal received when the wireless module 170 is connected to an external electronic device, or a control signal generated by the micro controller 140. However, the invention is not limited to the above description, and those skilled in the art can design a suitable power supplying method according to an actual requirement or desire.

In the high power supply mode, the micro controller 140 can instantly converts the detecting value DV detected by the fluid flow detector 120 to the flow value FV. Since the detecting value DV received by the micro controller 140 probably correspond to measuring results of the fluid flow detector 120 (when the fluid flow detector 120 is a fluid displacement tachometer, the detecting value DV probably includes an analog rotation speed value and a time value corresponding to the rotation speed, etc.), in case of the high power supply mode, the micro controller 140 may support enough computation capability, and convert the measuring results corresponding to the detecting value DV to the flow value FV of the corresponding fluid. However, the invention is not limited thereto, and in another embodiment, the micro controller 140 can convert the detecting values DV into the flow values FV under the low power supply mode. More specifically, before the detecting values DV or the flow values FV are stored, the micro controller 140 can first convert the detecting values DV or the flow values FV into digital data. The digital data is then stored in the memory 130. Therefore, the fluid flow detector 120 or the micro controller 140 may include an analog-to-digital converter (ADC), and the conversion can be executed by the fluid flow detector 120 or the micro controller 140, which the invention is not limited thereto.

The micro controller 140 may include a value conversion unit/firmware for directly converting the detecting values DV into the flow values FV (for example, the micro controller may store a conversion table, and perform the conversion by looking up the conversion table), or the micro controller 140 may calculate the flow values FV of the corresponding fluid according to a plurality of parameters in collaboration with the detecting values DV. The parameters may include possible errors generated during the measurement, for example, a friction coefficient between the fluid and the supply tube in the fluid flow provider 110, a kinetic energy loss of the power generator 150 and kinetic energy/ electric energy conversion coefficient of the power generator 150, etc. In other embodiments of the invention, the value conversion unit/firmware/conversion table can be configured outside the micro controller 140, and is coupled to the micro controller 140, though the invention is not limited thereto. On the other hand, if the memory 130 stores the un-converted detecting values DV (for example, the detecting values DV corresponding to a plurality of time sections that are detected before the supplying power HSP is received), the micro controller 140 can also convert the detecting values DV pre-stored in the memory 130 to the flow values FV under the high power supply mode, and store the flow values FV according to an actual requirement or accumulates the flow values FV. The micro controller 140 may accumulate the flow values FV by adding the flow values FV converted from the detecting values DV currently received by the fluid flow detector 120 to the one originally stored in the memory 130, or replacing the flow values FV originally stored in the memory 130 with the flow values FV converted from the detecting values DV currently received by the fluid flow detector 120, but not limited thereto.

The battery module 160 can be a general dry battery, or can be a rechargeable battery, etc. In an embodiment of the invention, the battery module 160 is a solar energy battery. In the embodiment, when the solar energy battery receives the sunlight to generate enough electricity (which is, for example, greater than the predetermined voltage), the battery module 160 can provide the supply power HSP, and the micro controller 140 can be switched to the high supply power mode to perform the aforementioned conversion. When the sunlight is inadequate or not enough, the micro controller 140 maintains the low power supply mode, and meters the flow of the fluid only when the fluid flows. In other embodiments, the battery module 160 may serve as a backup power, and when the power generator 150 is abnormal, the battery module 160 can provide power (for example, the supplying power SP or the supplying power HSP) to the micro controller 140 and other devices such as the fluid flow detector 120, etc. to maintain operations thereof.

On the other hand, the wireless module 170 is coupled to the memory 130, and when the wireless module 170 is connected to an external device through a wireless connection method, the wireless module 170 can transmit the flow values FV or the detecting values DV stored in the memory 130 to the external device. The external device can be a flow meter, and a fluid supplier such as a water company or a gas company can receive the flow of the fluid used by a subscriber (i.e. a user using the fluid flow metering device 10) through the wireless module 170. The wireless connection method is, for example, a standard connection method of radio signals such as wireless fidelity (WiFi), bluetooth, wideband code division multiple access (WCDMA), near field communication (NFC), radio frequency identification (RFID) or long term evolution (LTE), etc., which is determined according to an actual requirement, and is not limited by the invention.

On the other hand, in an embodiment of the invention, the wireless module 170 can be connected to the fluid flow detector 120, the memory 130 and the micro controller 140. The wireless module 170 can obtain a supplying power WP from the external through a wireless connection, and supply the same to the micro controller 140, the memory 130 and the fluid flow detector 120, such that the related devices can normally operate. In an embodiment, the micro controller 140 can set the working mode to the high power supply mode when obtain the aforementioned supplying power WP, the wireless power supplying mechanism is, for example, implemented through near field communication (NFC), or radio frequency identification (RFID), though the invention is not limited thereto.

In an embodiment of the invention, the aforementioned wireless connection method is an NFC connection, and the wireless module 170 is an NFC circuit. In the embodiment, when the external device is trying to connect the wireless module 170, the external device can provide a supplying power (for example, the supplying power WP) to the wireless module 170 through the NFC connection, and the wireless module 170 can transmit the flow values FV stored in the memory 130 to the external device. Meanwhile, such supplying power WP can also be supplied to the fluid flow detector 120, the memory 130 and the micro controller 140. In the present embodiment, the battery module 160 can be selectively implemented. In an embodiment, when the battery module 160 is not implemented, the micro controller 140 can be switched to the high power supply mode each time when the wireless module 170 is connected to the external device through the NFC connection, and converts the detecting values DV stored in the memory 130 to the flow values FV. After the flow values FV are generated, the wireless module 170 transmits the flow values FV to the external device through the wireless connection. The aforementioned wireless module may have a wireless communication function and a wireless power supplying function, and those skilled in the art can select a suitable wireless module 170 according to an actual requirement.

After the wireless module 170 transmits the flow value FV to the external device, the wireless module 170 (or the micro controller 140) can set the flow value FV stored in the memory 130 to zero. Alternatively, besides the originally stored flow value FV, a new batch of the flow value FV is stored, for example, a flag is added to indicate that the originally stored flow value FV has been transmitted to the external device. Namely, the memory 130 may store a batch of flow value FV that is set to zero after each meter check (i.e. the flow value FV is transmitted to the external device), and another batch of continuously accumulated flow value FV, or one of the above two values is selectively stored, which is not limited by the invention.

Moreover, besides the aforementioned battery module 160, the wireless module 170 is also selectively implemented. For example, the user can connect the memory 130 and access the flow values FV through other wired connection other than the wireless connection, and can transmit power to the micro controller 140 through the wired connection, which is not limited by the invention.

In another embodiment of the invention, when the wireless module 170 is an NFC tag or a RFID tag, the NFC tag or the RFID tag may have an internal memory. In the present embodiment, the memory 130 and the internal memory can be integrated into one memory for storing the aforementioned detecting values DV or the flow values FV. In another embodiment, the internal memory in the NFC tag or the RFID tag and the memory 130 can be two independent memories, and those skilled in the art can determine to use the integrated memory or the independent memories according to an actual requirement.

In an embodiment of the invention, the fluid flow metering device 10 may further include a display unit (not shown), and when the micro controller 140 determines that the accumulated flow value FV is greater than a threshold, the micro controller 140 can display a warning message on the display unit to remind the user that a current usage amount (the flow of the fluid) has exceeded expectation. In another embodiment of the invention, the fluid flow metering device 10 can be disposed on a water filter. When the micro controller 140 determines that the accumulated flow value FV is greater than a threshold, the micro controller 140 can display a warning message on the display unit, and when the user views/perceives the warning message, the user learns that a filter is required to be replaced, or the water filter is required to be cleaned.

Figure 3:
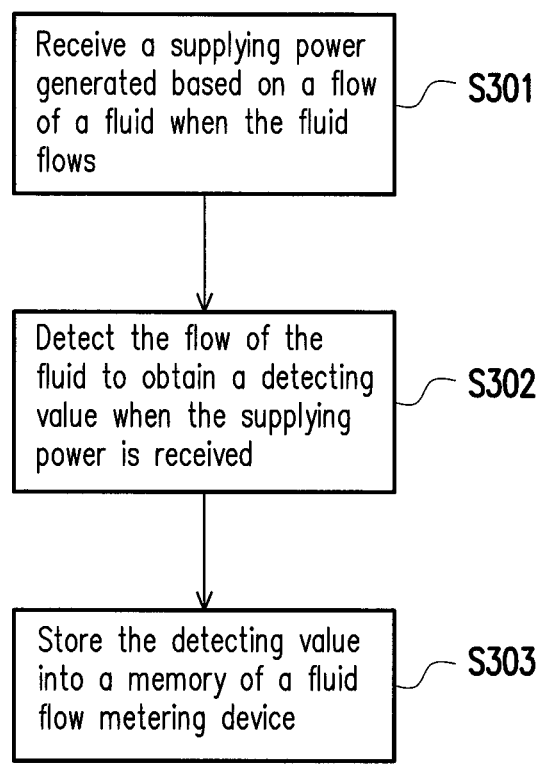
FIG. 3 is a flowchart illustrating a method for metering fluid flow according to an embodiment of the invention.

An embodiment of the invention provides a method for metering fluid flow, which is adapted to a fluid flow metering device using a supply tube to supply a fluid. FIG. 3 is a flowchart illustrating a method for metering fluid flow according to an embodiment of the invention. Referring to FIG. 3, first, in step S301, when the fluid flows, a supplying power generated based on the flow of the fluid is received. In step S302, when the supplying power is received, the flow of the fluid is detected to obtain flow information (for example, a detecting value). In step S303, the flow information is stored to a memory of the fluid flow metering device. Details of the above method may refer to descriptions of FIG. 1 and FIG. 2, which are not repeated.

In summary, the embodiments of the invention provide a fluid flow metering device and a method for metering fluid flow, by which the power generated base on the flow of the fluid can be used to meter or record the flow of the fluid. The fluid flow metering device can operate under a low power supply mode and a high power supply mode. The power supplied under the low power supply mode can be the power generated based on the flow of the fluid. The power supplied under the high power supply mode can be from a battery (for example, a solar battery) or an external device (for example, to supply power through the NFC connection). In case of operating under the high power supply mode, the detecting value corresponding to the flow that is metered under the low power supply mode is converted into the corresponding flow value for meter check or other applications. In this way, interruption of metering the fluid flow due to power off is avoided, and the fluid flow metering device is unnecessary to cut off the supply of the fluid. Moreover, since it is not required to receive any external power at the moment when the flow is metered, and only after the flow is metered or before the meter check, enough power can be supplied to obtain the flow value through conversion, by which management convenience is achieved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A fluid flow metering device, comprising:
  a fluid flow detector, disposed in a supply tube of a fluid flow provider;
  a memory;
  a micro controller, coupled to the fluid flow detector and the memory; and
  a power generator, disposed in the supply tube and is coupled to the fluid flow detector, the memory and the micro controller,
  wherein when a fluid flows in the supply tube, the power generator generates a first supplying power through flow of the fluid by converting kinetic energy of the flow of the fluid to electric energy, and provides the first supplying power to the fluid flow detector, the memory and the micro controller,
  when the fluid flow detector detects the flow of the fluid, the fluid flow detector detects the flow of the fluid outputted from the supply tube to derive a detecting value,
  wherein the micro controller has a low power supply mode and a high power supply mode,
  wherein the micro controller is in the high power supply mode when the micro controller receives a second supplying power,
  when in the low power supply mode, the micro controller receives the detecting value and writes the detecting value into the memory, and when in the high power supply mode, the micro controller converts the detecting value into a flow value and writes the flow value into the memory.

2. The fluid flow metering device as claimed in claim 1, wherein
  only when the micro controller receives the first supplying power generated through the flow of the fluid in the supply tube, the micro controller enters the low power supply mode.

3. The fluid flow metering device as claimed in claim 2, wherein
  when the micro controller enters the high power supply mode and the fluid flow detector detects that the fluid flows simultaneously, the micro controller receives the detecting value from the fluid flow detector, and converts the detecting value and writes the same into the memory, and
  when the micro controller enters the high power supply mode, and the detecting value is stored in the memory, the micro controller reads the detecting value, converts the detecting value into the flow value, and writes the flow value into the memory.

4. The fluid flow metering device as claimed in claim 2, wherein the micro controller converts the detecting value into the flow value according to a plurality of parameters, wherein the parameters comprise a friction coefficient between the fluid and the supply tube, and a kinetic energy or electric energy conversion coefficient of the power generator.

5. The fluid flow metering device as claimed in claim 1, wherein
  the micro controller comprises a value conversion unit, and when the micro controller enters the high power supply mode, the micro controller converts the detecting value into the flow value through a table lookup method.

6. The fluid flow metering device as claimed in claim 1, further comprising:
  a battery module, coupled to the fluid flow detector, the memory and the micro controller, wherein the battery module supplies the second supplying power to the fluid flow detector, the memory and the micro controller when an electric quantity of the battery module is greater than a predetermined value or the power generator is unable to provide the first supplying power, wherein the micro controller is in the high power supply mode.

7. The fluid flow metering device as claimed in claim 6, wherein
  the battery module is a solar energy battery.

8. The fluid flow metering device as claimed in claim 1, further comprising:
  a wireless module, coupled to the memory, wherein when the wireless module is connected to an external device through a wireless connection method, the wireless module transmits the flow value or the detecting value stored in the memory to the external device.

9. The fluid flow metering device as claimed in claim 8, wherein the wireless connection method is complied with a wireless fidelity (WiFi), a Bluetooth, a wideband code division multiple access (WCDMA), a near field communication (NFC), a radio frequency identification (RFID) or a long term evolution (LTE).

10. The fluid flow metering device as claimed in claim 8, wherein
  the wireless module is further coupled to the fluid flow detector and the micro controller, and
  when the wireless module is connected to the external device through the wireless connection method, the wireless module receives a second supplying power from the external device, and supplies the second supplying power to the fluid flow detector, the memory and the micro controller.

11. The fluid flow metering device as claimed in claim 1, further comprising:
  a display unit, coupled to the micro controller,
  wherein when the micro controller determines that the flow value is greater than a threshold, the micro controller controls the display unit to display a warning message.

12. The fluid flow metering device as claimed in claim 1, wherein
  the memory is a non-volatile memory.

13. The fluid flow metering device as claimed in claim 1, wherein
  the memory is a resistive random-access memory (RRAM), a ferroelectric RAM (FeRAM), a magneto resistive RAM (MRAM), a phase change RAM (PRAM), or a conductive bridge RAM (CBRAM).

14. A method for metering fluid flow, adapted to a fluid flow metering device disposed in a supply tube supplying a fluid, the method for metering fluid flow comprising:
- receiving, by a micro controller, a first supplying power generated by converting kinetic energy of a flow of the fluid to electric energy when the fluid flows;
- detecting, by a fluid flow detector, the flow of the fluid to obtain a detecting value-when the first supplying power is received; and
- receiving the detecting value and writing the detecting value into the memory by the micro controller when in a low power supply mode, and converting the detecting value into a flow value and writing the flow value into the memory by the micro controller when in a high power supply mode,
- wherein the micro controller is in the high power supply mode when the micro controller receives a second supplying power.

15. The method for metering fluid flow as claimed in claim 14, the method further comprises:
- entering the low power supply mode only when the first supplying power generated through the flow of the fluid in the supply tube is received by the micro controller.

16. The method for metering fluid flow as claimed in claim 15, wherein the step of converting the detecting value into the flow value comprises:
- reading the detecting value, converting the detecting value into the flow value, and writing the flow value into the memory when the micro controller enters the high power supply mode and the memory is stored with the detecting value.

17. The method for metering fluid flow as claimed in claim 15, wherein the step of converting the detecting value into the flow value comprises:
- converting the detecting value into the flow value according to a plurality of parameters, wherein the parameters comprise a friction coefficient between the fluid and the supply tube, and a kinetic energy or electric energy conversion coefficient of the supplying power.

18. The method for metering fluid flow as claimed in claim 15, wherein the step of entering the high power supply mode comprises:
- receiving the second supplying power from a battery module.

19. The method for metering fluid flow as claimed in claim 14, further comprising:
- connecting an external device wirelessly; and
- transmitting the detecting value stored in the memory to the external device.

20. The method for metering fluid flow as claimed in claim 14, further comprising:
- receiving the second supplying power from an external device according to a wireless power supplying mechanism.

21. The method for metering fluid flow as claimed in claim 14, further comprising:
- controlling a display unit to display a warning message when it is determined that the flow value is greater than a threshold.

* * * * *